United States Patent
Ahn et al.

(10) Patent No.: US 8,442,165 B2
(45) Date of Patent: May 14, 2013

(54) METHOD AND APPARATUS FOR ESTIMATING DOPPLER FREQUENCY IN A MOBILE TERMINAL

(75) Inventors: Kyung-Seung Ahn, Jeonju-si (KR); Hun-Kee Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 806 days.

(21) Appl. No.: 12/498,618

(22) Filed: Jul. 7, 2009

(65) Prior Publication Data
US 2010/0008452 A1   Jan. 14, 2010

(30) Foreign Application Priority Data
Jul. 8, 2008 (KR) .................. 10-2008-0065812

(51) Int. Cl.
*H03D 1/00* (2006.01)
*H04L 27/06* (2006.01)

(52) U.S. Cl.
USPC .......................................................... 375/343

(58) Field of Classification Search .................. 375/147, 375/260, 340, 341, 342, 343, 344, 345, 347, 375/354, 355
See application file for complete search history.

(56) References Cited

U.S. PATENT DOCUMENTS

| | | | |
|---|---|---|---|
| 6,424,642 B1* | 7/2002 | Schmidl et al. | 370/342 |
| 2002/0097782 A1* | 7/2002 | Pajukoski | 375/147 |
| 2002/0172307 A1* | 11/2002 | Sandberg | 375/344 |
| 2002/0181553 A1* | 12/2002 | Mallette et al. | 375/147 |
| 2002/0181626 A1* | 12/2002 | Sung | 375/347 |
| 2005/0107096 A1* | 5/2005 | Freiha | 455/456.6 |
| 2006/0153322 A1* | 7/2006 | Varikat et al. | 375/354 |
| 2006/0176941 A1* | 8/2006 | Nieto et al. | 375/152 |
| 2006/0176983 A1* | 8/2006 | Wadsworth et al. | 375/343 |
| 2009/0252263 A1* | 10/2009 | Liu et al. | 375/344 |

* cited by examiner

*Primary Examiner* — David C. Payne
*Assistant Examiner* — Syed Haider
(74) *Attorney, Agent, or Firm* — The Farrell Law Firm, P.C.

(57) ABSTRACT

A method and apparatus for estimating a Doppler frequency in a mobile terminal are provided. The method includes calculating two autocorrelation values for intervals of at least one sample from a channel estimation tap with a maximum power, and estimating a maximum Doppler frequency using the two autocorrelation values. The two autocorrelation values are autocorrelation values for intervals of different numbers of samples.

8 Claims, 4 Drawing Sheets

METHOD AND APPARATUS FOR ESTIMATING DOPPLER FREQUENCY IN A MOBILE TERMINAL

PRIORITY

This application claims priority under 35 U.S.C. §119 to an application filed in the Korean Intellectual Property Office on Jul. 8, 2008 and assigned Serial No. 10-2008-0065812, the contents of which are incorporated herein by reference.

BACKGROUND OF THE INVENTION

1. Field of the Invention

The present invention relates generally to a method and apparatus for estimating a Doppler frequency in a mobile terminal, and more particularly to a method and apparatus for estimating a Doppler frequency independent of a channel estimation error in a mobile terminal.

2. Description of the Related Art

In order to provide high-speed multimedia packet services through limited channel resources in a mobile communication system, it is important to allocate system resources using accurate channel information. The speed of a mobile terminal is a very important factor of the channel information. For example, the speed of a mobile terminal is used to determine a coefficient of a receiver, such as a channel estimation length or an interleaver size, by most adaptive algorithms used in mobile communication environments. The speed of a mobile terminal is also used for power control or handover of the mobile terminal.

While moving, the mobile terminal experiences a so-called Doppler shift, i.e., a frequency shift of a received (RX) signal. The Doppler shift causes a frequency offset of an RX signal in proportion to the speed of the mobile terminal relative to a Base Station (BS). Thus, based on the fact that the speed of a mobile terminal is proportional to a frequency error of an RX signal caused by a Doppler shift, conventional technologies estimate a maximum Doppler frequency of an RX signal to estimate the speed of a mobile terminal. For example, conventional methods estimate the maximum Doppler frequency using Level Crossing Rate (LCR) and Zero Crossing Rate (ZCR) characteristics, an autocorrelation function value of an RX signal, a Fast Fourier Transform (FFT), or a covariance of the square of an RX signal strength.

If it is assumed that a complete channel is estimated in a noise-free environment by jakes modeling of a mobile communication channel, an autocorrelation function of a wireless channel h(n) can be expressed as shown Equation (1):

$$R_{hh}(k) = E[h(n)h^*(n+k)] = \sigma_h^2 J_0(2\pi F_D T_s k), \quad (1)$$

where E[x] denotes an expected value of x, $T_s$ denotes a sampling period, $f_D$ denotes a maximum Doppler frequency, $\sigma_h^2$ denotes the power of a channel h(n), and $J_0(\ )$ denotes a zero-order Bessel function of the first kind.

$R_{hh}(0)$ and $R_{hh}(1)$ are determined from Equation (1) and then the maximum Doppler frequency $f_D$ is determined as shown in Equation (2):

$$f_D = \frac{1}{\pi T_s} \sqrt{1 - \frac{R_{hh}(1)}{R_{hh}(0)}}, \quad (2)$$

where $T_s$ denotes a sampling period and $R_{hh}(0)$ and $R_{hh}(1)$ denote autocorrelation functions of wireless channels.

Equation (2) is the estimation of the maximum Doppler frequency on the assumption that a complete channel was estimated in a noise-free environment. However, noises that are actually present in a channel of a real wireless environment make it difficult to accurately estimate the channel, thus degrading system performance.

When channel estimation is inaccurate, due to a noise, for example, an estimated channel can be expressed as shown in Equation (3):

$$h(n) = \rho \hat{h}(n) + e(n), \quad (3)$$

where h(n) denotes an estimated channel, ρ denotes a normalized correlation coefficient between the original channel and the estimated channel, and e(n) denotes a white noise with a mean of 0 and a variance of $1-|\rho|^2$.

When the estimated channel is expressed as Equation (3), an autocorrelation function can be expressed as shown in Equation (4). Herein, like in the error-free case, the maximum Doppler frequency is expressed by R(0) and R(1) as shown in Equation (5) below.

$$R(k) = \sigma_h^2 |\rho|^2 J_0(2\pi f_D T_s k) + (1-|\rho|^2)\delta(k) \quad (4)$$

In Equation (4), R(k) denotes an autocorrelation function for k samples, $T_s$ denotes a sampling period, $f_D$ denotes a maximum Doppler frequency, $\sigma_h^2$ denotes the power of a channel h(n), $J_0(\ )$ denotes a zero-order Bessel function of the first kind, and δ(k) denotes a delta function.

$$f_D = \frac{1}{\pi T_s} \sqrt{1 - \frac{1}{|\rho|^2}\left(1 + \frac{1-|\rho|^2}{\sigma_h^2}\right)\frac{R(1)}{R(0)}} \quad (5)$$

In Equation (5), $T_s$ denotes a sampling period, $f_D$ denotes a maximum Doppler frequency, $\sigma_h^2$ denotes the power of a channel h(n), and R(k) denotes an autocorrelation function for k samples.

A conventional method of estimating a maximum Doppler frequency using an autocorrelation function as described above is effective only when aware of accurate noise power. When the accurate noise power is unavailable, the conventional method cannot accurately estimate the speed of a mobile terminal, thus causing performance degradation. That is, as illustrated in FIG. 1, as a Signal-to-Noise Ratio (SNR) decreases with an increase in noise error, an estimation error in the maximum Doppler frequency increases, thus increasing an estimation error in the speed of the mobile terminal.

SUMMARY OF THE INVENTION

Accordingly, the present invention has been designed to address at least the above problems and/or disadvantages and to provide at least the advantages describe below. Therefore, an aspect of the present invention is to provide a method and apparatus for estimating a Doppler frequency in a mobile terminal.

Another aspect of the present invention is to provide a method and apparatus for estimating a maximum Doppler frequency independent of a channel estimation error in a mobile terminal.

Another aspect of the present invention is to provide a method and apparatus for estimating a Doppler frequency in a mobile terminal by using two autocorrelation values for intervals of one or more samples for an estimated channel.

In accordance with an aspect of the present invention, a method for estimating a Doppler frequency in a mobile terminal is provided. The method includes calculating two autocorrelation values for intervals of one or more samples from a channel estimation tap with the maximum power; and estimating a maximum Doppler frequency by using the two autocorrelation values. The two autocorrelation values are autocorrelation values for intervals of different numbers of samples.

In accordance with another aspect of the present invention, an apparatus for estimating a Doppler frequency in a mobile terminal is provided. The apparatus includes a Doppler frequency estimator calculating two autocorrelation values for intervals of one or more samples from a channel estimation tap with the maximum power, and estimating a maximum Doppler frequency by using the two autocorrelation values. The two autocorrelation values are autocorrelation values for intervals of different numbers of samples.

BRIEF DESCRIPTION OF THE DRAWINGS

The above and other aspects, features, and advantages of the present invention will become more apparent from the following detailed description when taken in conjunction with the accompanying drawings in which.

DETAILED DESCRIPTION OF EMBODIMENTS OF THE PRESENT INVENTION

Figure 1:
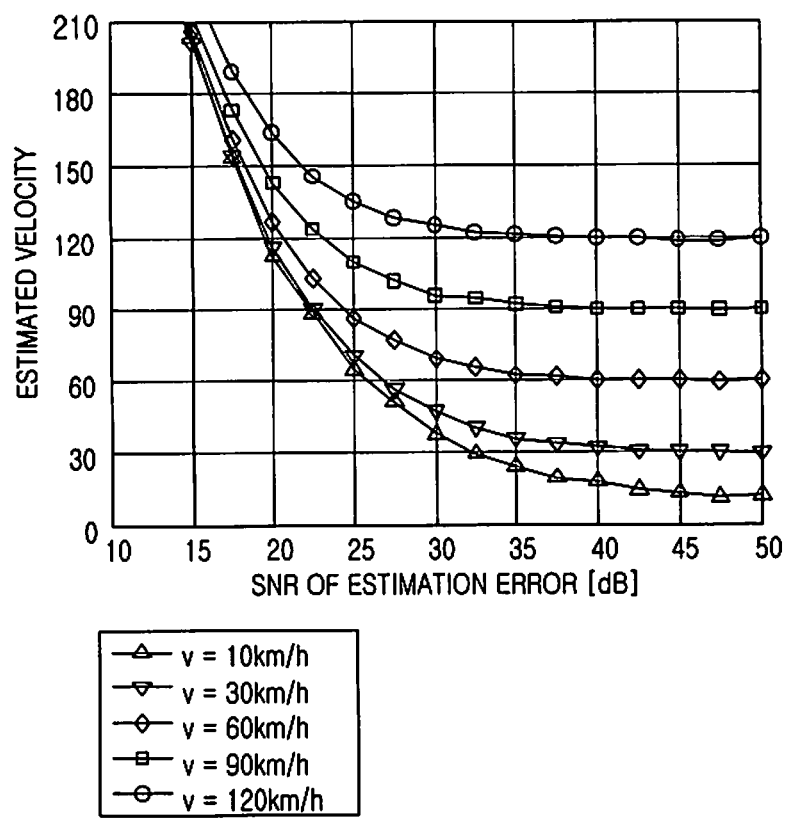
FIG. 1 is a diagram illustrating an estimation of a speed of a mobile terminal based on a maximum Doppler frequency in a conventional mobile communication system.

Embodiments of the present invention are described in detail with reference to the accompanying drawings. The same or similar components may be designated by the same or similar reference numerals although they are illustrated in different drawings. Further, detailed descriptions of constructions or processes known in the art may be omitted to avoid obscuring the subject matter of the present invention.

As indicated above, a method and apparatus for estimating a maximum Doppler frequency independent of a channel estimation error in a mobile terminal are described herein.

First, a description will be given of equations for estimating a maximum Doppler frequency, independent of a channel estimation error, in accordance with an embodiment of the present invention.

When a channel is not accurately estimated, for example, due to a channel noise, and an autocorrelation function is expressed as shown in Equation (4) above, autocorrelation values for sample intervals may be expressed as shown in Equation (6).

$$R(1) = \sigma_h^2 |\rho|^2 J_0(2\pi f_D T_s)$$
$$R(2) = \sigma_h^2 |\rho|^2 J_0(4\pi f_D T_s)$$
$$\vdots$$
$$R(k) = \sigma_h^2 |\rho|^2 J_0(2k\pi f_D T_s), \text{ for } k \geq 1$$

(6)

In Equation (6), $R(1)$ denotes an autocorrelation value for a one-sample interval, $R(k)$ denotes an autocorrelation value for a k-sample interval, $T_s$ denotes a sampling period, $f_D$ denotes a maximum Doppler frequency, $\sigma_h^2$ denotes the power of a channel $h(n)$, $J_0(\ )$ denotes a zero-order Bessel function of the first kind, and p denotes a normalized correlation coefficient between the original channel and the estimated channel.

Herein, the autocorrelation value for each sample interval is influenced by a channel estimation error $\rho$, but the influence of the channel estimation error p may be removed using an autocorrelation value $R(m)$ for an m-sample interval and an autocorrelation value $R(k)$ for a k-sample interval, where m and k are different numbers greater than 0. For convenience in explaining the present invention, the following description is made on the assumption of using an autocorrelation value $R(1)$ for a one-sample interval and an autocorrelation value $R(k)$ for a k-sample interval. For example, the influence of the channel estimation error $\rho$ may be removed using an autocorrelation value $R(1)$ for a one-sample interval and an autocorrelation value $R(k)$ for a k-sample interval as shown in Equation (7).

$$C_{k1} = \frac{R(k)}{R(1)} = \frac{J_0(2k\pi f_D T_s)}{J_0(2\pi f_D T_s)}, \text{ for } k \geq 2$$

(7)

In Equation (7), $R(1)$ denotes an autocorrelation value for a one-sample interval, $R(k)$ denotes an autocorrelation value for a k-sample interval, $T_s$ denotes a sampling period, $f_D$ denotes a maximum Doppler frequency, and $J_0(\ )$ denotes a zero-order Bessel function of the first kind.

Herein, because the first-kind, zero-order Bessel function $J_0(\ )$ may be approximated as $$J_0(x) \approx 1 - \frac{1}{4}x^2$$

for a very small value x, Equation (7) may be approximated as shown in Equation (8).

$$C_{k1} \approx \frac{1 - (k\pi f_D T_s)^2}{1 - (\pi f_D T_s)^2}, \text{ for } k \geq 2$$

(8)

In Equation (8), $T_s$ denotes a sampling period and $f_D$ denotes a maximum Doppler frequency.

By rearranging Equation (8), a Doppler frequency estimation equation may be expressed as shown in Equation (9).

$$f_D = \frac{1}{\pi T_s} \sqrt{\frac{1 - C_{k1}}{k^2 - C_{k1}}}, \text{ for } k \geq 2$$

(9)

In Equation (9), $f_D$ denotes a maximum Doppler frequency, $T_s$ denotes a sampling period, and $C_{k1}$ denotes the division of an autocorrelation value for a k-sample interval by an autocorrelation value for a one-sample interval.

It may be seen from the above that the maximum Doppler frequency based on Equation (9) is not influenced by the channel estimation error.

Hereinafter, a description will be given of a technique for estimating a maximum Doppler frequency using Equation (9). For ease of explanation, the following description is made on the assumption that m is 1 and k is 2.

Figure 2:
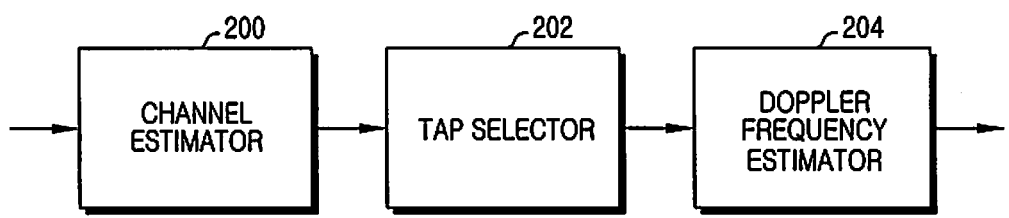
FIG. 2 is a block diagram of a mobile terminal in a mobile communication system according to an embodiment of the present invention.

FIG. 2 is a block diagram illustrating a mobile terminal in a mobile communication system according to an embodiment of the present invention.

Referring to FIG. 2, the mobile terminal includes a channel estimator 200, a tap selector 202, and a Doppler Frequency estimator 204.

The channel estimator 200 estimates an impulse response of a wireless channel using a general channel estimation method, and provides the estimation results to the tap selector 202. The tap selector 202 selects a channel tap with a maximum power from the estimation results received from the channel estimator 200.

Based on the channel tap coefficient with the maximum power, the Doppler frequency estimator 204 performs an autocorrelation to estimate a maximum Doppler frequency as shown in Equation (9). That is, the Doppler frequency estimator 204 divides an I-channel component and a Q-channel component from the channel tap coefficient with the maximum power, and determines autocorrelation values $R_I(1)$ and $R_I(2)$ for the I-channel component and autocorrelation values $R_Q(1)$ and $R_Q(2)$ for the Q-channel component.

Thereafter, the Doppler frequency estimator 204 adds the autocorrelation value $R_I(1)$ of the I-channel component and the autocorrelation value $R_Q(1)$ of the Q-channel component for a one-sample interval ($R_I(1)+R_Q(1)$) and adds the autocorrelation value $R_I(2)$ of the I-channel component and the autocorrelation value $R_Q(2)$ of the Q-channel component for a two-sample interval ($R_I(2)+R_Q(2)$) to obtain an autocorrelation value $R(1)$ for the one-sample interval and an autocorrelation value $R(2)$ for the two-sample interval. The Doppler frequency estimator 204 then divides the autocorrelation value $R(2)$ by the autocorrelation value $R(1)$ and uses the division result value $C_{12}$ to estimate a maximum Doppler frequency as shown in Equation (9).

Figure 3:
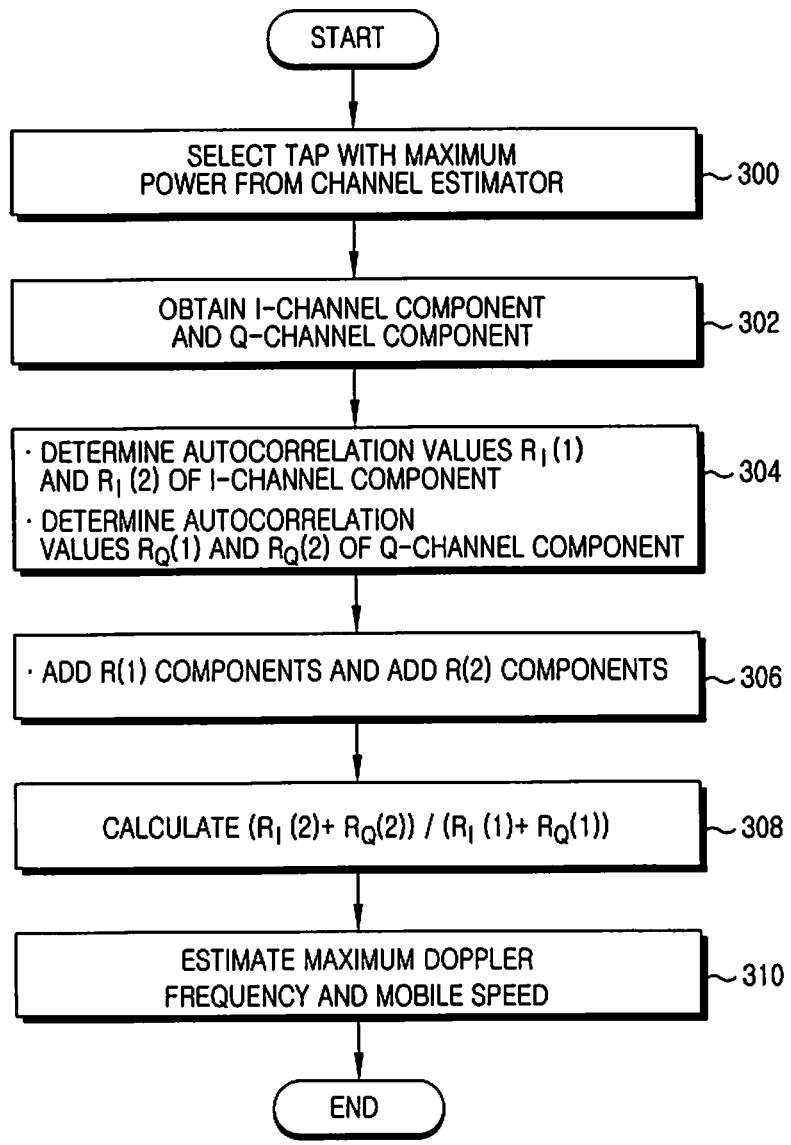
FIG. 3 is a flow chart illustrating an operational process of a mobile terminal in a mobile communication system according to an embodiment of the present invention.

FIG. 3 is a flow chart illustrating an operational process of a mobile terminal in a mobile communication system according to an embodiment of the present invention.

Referring to FIG. 3, in step 300, the mobile terminal estimates a channel by the channel estimator 200 and selects a tap with the maximum power from the estimated channel. In step 302, the mobile terminal divides an I-channel component and a Q-channel component from the selected tap coefficient.

In step 304, the mobile terminal determines autocorrelation values $R_I(1)$ and $R_I(2)$ for the I-channel component and autocorrelation values $R_Q(1)$ and $R_Q(2)$ for the Q-channel component.

In step 306, the mobile terminal adds the autocorrelation value $R_I(1)$ of the I-channel component and the autocorrelation value $R_Q(1)$ of the Q-channel component for a one-sample interval ($R_I(1)+R_Q(1)$) and adds the autocorrelation value $R_I(2)$ of the I-channel component and the autocorrelation value $R_Q(2)$ of the Q-channel component for a two-sample interval ($R_I(2)+R_Q(2)$) to obtain an autocorrelation value $R(1)$ for the one-sample interval and an autocorrelation value $R(2)$ for the two-sample interval.

In step 308, the mobile terminal divides the autocorrelation value $R(2)$ by the autocorrelation value $R(1)$.

In step 310, the mobile terminal uses the division result value ($C_{12}=R(2)/R(1)$) to estimate a maximum Doppler frequency as shown in Equation (9). Thereafter, the mobile terminal ends the operation process.

Figure 4:
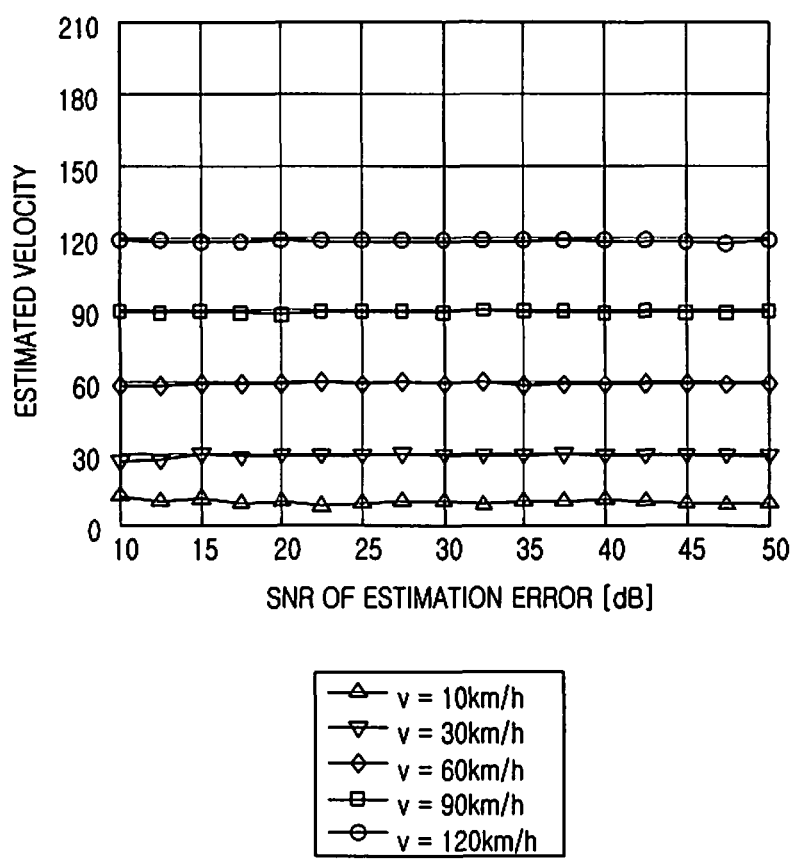
FIG. 4 is a diagram illustrating an estimation of a speed of a mobile terminal based on a maximum Doppler frequency in a mobile communication system according to an embodiment of the present invention.

When a Doppler frequency is estimated using Equation (9) as described above, a maximum Doppler frequency may be estimated independently of a channel estimation error. Therefore, when the speed of the mobile terminal is determined using the maximum Doppler frequency estimation, the speed of the mobile terminal may be estimated equally even when there is an error in Signal-to-Noise Ratio (SNR) estimation, as illustrated in the graph of FIG. 4.

In accordance with the embodiments of the present invention as described above, a mobile terminal estimates a channel, divides an I-channel component and a Q-channel component from the tap coefficient with the maximum power, and uses two autocorrelation values for the I-channel component and two autocorrelation values for the Q-channel component to estimate a maximum Doppler frequency robust against a channel estimation error. Therefore, in accordance with an embodiment of the present invention, it is possible to accurately estimate the speed of the mobile terminal even in the event of inaccurate channel noise estimation, thus making it possible to improve the system reliability.

While the present invention has been shown and described with reference to certain embodiments thereof, it will be understood by those skilled in the art that various changes in form and details may be made therein without departing from the spirit and scope of the present invention as defined by the appended claims. Therefore, the scope of the present invention is defined not by the detailed description of the invention but by the appended claims and their equivalents.

What is claimed is:

1. A method for estimating a Doppler frequency in a mobile terminal including a channel estimation tap and a Doppler frequency estimator, the method comprising:
    determining a first autocorrelation value and a second autocorrelation value for intervals of at least one sample from the channel estimation tap with a maximum power;
    dividing the first autocorrelation value by the second autocorrelation value and removing a channel estimation error component; and
    estimating, by the Doppler frequency estimator, a maximum Doppler frequency based on a result of the dividing,
    wherein the first autocorrelation value and the second autocorrelation value are for intervals of different numbers of samples.

2. The method of claim 1, wherein determining the first and second autocorrelation values comprises:
    dividing an I-channel component and a Q-channel component from the channel estimation tap with the maximum power;
    determining two autocorrelation values of each of the I-channel component and the Q-channel component for intervals of the at least one sample; and
    adding the autocorrelation value of the I-channel component and the autocorrelation value of the Q-channel component for each sample interval.

3. The method of claim 1, wherein dividing the first correlation value by the second correlation value is performed using:

$$C_{k1} = \frac{R(k)}{R(m)} = \frac{J_0(2k\pi f_D T_s)}{J_0(2\pi f_D T_s)}, \text{ for } k \geq 1, m \geq 1, k \neq m$$

where $R(k)$ denotes an autocorrelation value for a k-sample interval, $R(m)$ denotes an autocorrelation value for an m-sample interval, $T_s$ denotes a sampling period, $f_D$ denotes a maximum Doppler frequency, and $J_0(\ )$ denotes a zero-order Bessel function of a first kind.

4. The method of claim 1, wherein estimating the maximum Doppler frequency is performed using:

$$f_D = \frac{1}{\pi T_s}\sqrt{\frac{1-C_{km}}{k^2-C_{km}}}, \text{ for } k \geq 1, m \geq 1, k \neq m$$

where $f_D$ denotes a maximum Doppler frequency, $T_s$ denotes a sampling period, and $C_{km}$ denotes the division of an autocorrelation value for a k-sample interval by an autocorrelation value for an m-sample interval.

5. An apparatus for estimating a Doppler frequency in a mobile terminal, comprising:
a Doppler frequency estimator for determining a first autocorrelation value and a second autocorrelation value for intervals of at least one sample from a channel estimation tap with a maximum power, for dividing the first autocorrelation value by the second autocorrelation value to remove a channel estimation error component, and for estimating a maximum Doppler frequency based on a result of the dividing,
wherein the first and second autocorrelation values are autocorrelation values for intervals of different numbers of samples.

6. The apparatus of claim 5, wherein the Doppler frequency estimator divides an I-channel component and a Q-channel component from the channel estimation tap with the maximum power, determines an autocorrelation value of each of the I-channel component and the Q-channel component for intervals of the at least one sample, and adds the autocorrelation value of the I-channel component and the autocorrelation value of the Q-channel component for each sample interval.

7. The apparatus of claim 5, wherein the Doppler frequency estimator divides the first autocorrelation value by the second autocorrelation value using:

$$C_{k1} = \frac{R(k)}{R(m)} = \frac{J_0(2k\pi f_D T_s)}{J_0(2\pi f_D T_s)}, \text{ for } k \geq 1, m \geq 1, k \neq m$$

where R(k) denotes an autocorrelation value for a k-sample interval, R(m) denotes an autocorrelation value for an m-sample interval, $T_s$ denotes a sampling period, $f_D$ denotes a maximum Doppler frequency, and $J_0(\ )$ denotes a zero-order Bessel function of the first kind.

8. The apparatus of claim 5, wherein the maximum Doppler frequency is estimated using:

$$f_D = \frac{1}{\pi T_s}\sqrt{\frac{1-C_{km}}{k^2-C_{km}}}, \text{ for } k \geq 1, m \geq 1, k \neq m$$

where $f_D$ denotes a maximum Doppler frequency, $T_s$ denotes a sampling period, and $C_{km}$ denotes the division of an autocorrelation value for a k-sample interval by an autocorrelation value for an m-sample interval.

* * * * *